United States Patent Office 3,242,123
Patented Mar. 22, 1966

3,242,123
GLYCIDYL ACRYLATE-STYRENE-ETHYL ACRYLATE-ITACONIC ACID INTERPOLYMERS
Howard Mayfield and William F. Hill, Jr., South Charleston, W. Va., assignors to Union Carbide Corporation, a corporation of New York
No Drawing. Filed Nov. 21, 1962, Ser. No. 239,368
12 Claims. (Cl. 260—29.6)

This invention relates to novel interpolymers of glycidyl acrylate, styrene, ethyl acrylate, and a member selected from the group consisting of acrylic and itaconic acids, and to compositions obtained by crosslinking such interpolymers.

The interpolymers of the instant invention are self-crosslinking polymers capable of producing low tack, flexible finishes which are durable to heat, washing and dry-cleaning. This makes them especially useful as backcoatings for upholstery fabrics, rugs, and the like. They can also be used as binders for non-woven fabrics, as well as for dyes and pigments.

The interpolymers of the instant invention are obtained by polymerizing an aqueous emulsion of glycidyl acrylate, styrene, ethyl acrylate, and a member selected from the group consisting of acrylic and itaconic acids. The resulting latex can be applied, for example, to the back of automobile or furniture upholstery fabric and air dried to provide a flexible backing which has low tack and is more resistant to heat, water and cleaning solvents than other known commercial backing materials. This procedure results in crosslinking of the interpolymer. No external crosslinking agent or heating is necessary to effect crosslinking, and just a very light coating of the crosslinked polymer on the back of ordinary upholstery fabrics strengthens the seams, improves dimensional stability, and eliminates fraying. If desired, crosslinking may be accelerated by heating the polymer. Temperatures of from about 100° C. to about 150° C., or higher, bring about rapid crosslinking, which occurs through a variety of reactions involving the epoxy and carboxyl groups present. The reactions of these groups produce ether, ester and anhydride linkages and can be illustrated by the following equations:

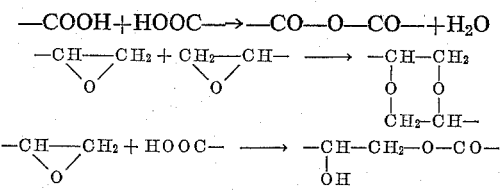

Water present may cause hydrolysis of the epoxy groups present to hydroxyl groups which can then condense with other hydroxyl groups or carboxyl groups present to produce further ether and ester linkages.

Among the outstanding properties displayed by the crosslinked polymers of the instant invention which render them especially suitable as backcoatings for upholstery fabrics, and the like, are flexibility, low tack, and resistance to heat, water and solvents. Flexibility is important in fitting the finished fabric, particularly around the contours of seats and the like. Low tack imparts a good hand to the fabric and prevents manufacturing difficulties from "blocking" in the roll to dragging and being difficult to handle on the cutting table and sewing machine. Resistance to heat, water and solvents are important to the consumer. Resistance to heat and boiling water is also important if a fabric is to be dyed after being backcoated.

The latexes of the instant invention are prepared by polymerizing an aqueous emulsion of glycidyl acrylate, styrene, ethyl acrylate, and a member selected from the group consisting of acrylic and itaconic acids, with a vinyl polymerization catalyst by heating at a temperature of from about 35° C. to about 70° C., preferably from about 45° C. to about 55° C. Preferably polymerization is effected in the absence of oxygen. It is usually desirable to have present from 0.35 percent by weight to 2.2 percent by weight, preferably from 0.88 percent by weight to 1.3 percent by weight, of a nonionic emulsifying or dispersing agent, based on the total overall weight of the emulsion. If desired, up to 1.1 percent by weight, preferably from 0.22 percent by weight to 0.52 percent by weight, of an anionic emulsifying or dispersing agent, based on the total overall weight of the emulsion, can also be present. The nonionic emulsifying or dispersing agents which can be employed include alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; and block copolymers of ethylene oxide and propylene oxide comprising a hydrophobic propylene oxide section combined with one or more hydrophilic ethylene oxide sections. Suitable anionic dispersing agents include the higher fatty alcohol sulfates, such as sodium lauryl sulfate, alkylaryl sulfonates, e.g. sodium or potassium isopropylbenzene sulfonates or isopropylnaphthalene sulfonates, alkali metal higher alkyl sulfosuccinates, e.g. sodium octyl sulfosuccinate, sodium N - methyl - N-palmitoyltaurate, sodium oleyl isothionate, and alkali metal salts of alkylarylpolyethoxyethanol sulfates or sulfonates, e.g. sodium t-octylphenoxypolyethoxyethyl sulfate having 1 to 5 oxyethylene units.

Any water-soluble vinyl polymerization catalyst can be employed in effecting polymerization according to the process of the instant invention. Peroxidic free-radical catalysts, particularly catalyst systems of the redox type, are generally employed. Such systems, as is well known, are combinations of oxidizing agents and reducing agents such as a combination of potassium persulfate and sodium bisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water soluble thiosulfates and hydrosulfites and the salts, such as the sulfates, of metals which are capable of existing in more than one valence state such as cobalt, iron, nickel, and copper. The catalyst can be employed in an amount of from 0.09 percent by weight to 1.1 percent by weight, preferably from 0.22 percent by weight to 0.52 percent by weight, of the total overall weight of the emulsion.

The latexes of the instant invention are prepared by polymerizing an aqueous emulsion containing from 0.35 percent by weight to 1.75 percent by weight, preferably from 0.66 percent by weight to 1.3 percent by weight, of glycidyl acrylate, from 1.1 percent by weight to 4.4 percent by weight, preferably from 1.76 percent by weight to 3.12 percent by weight, of styrene, from 30 percent by weight to 52 percent by weight, preferably from 39 percent by weight to 48 percent by weight, of ethyl acrylate, and from 0.35 percent by weight to 2.2 percent by weight, preferably from 0.88 percent by weight to 1.56 percent by weight, of a member selected from the group consisting of acrylic and itaconic acids, dispersed in from 45 percent by weight to 65 percent by weight, preferably from 48 percent by weight to 56 percent by weight, of water, based on the total overall weight of the emulsion. Since the polymerization reaction goes essentially to completion, all but a very small fraction of the initial monomer charge is consumed in the reaction. Hence the amount of polymer present in the latex is essentially equal to the initial monomer charge. These latexes thus contain from about 35 percent by weight to about 55 percent by weight, preferably from about 44 percent by weight to about 52 percent by weight, of dispersed polymer, which polymer contains from 0.9 mole percent to 2.7 mole percent, preferably from 1.3 mole percent to 2.2 mole percent, of combined glycidyl acrylate, from 2.9 mole percent to 7.8 mole percent, preferably from 3.9 mole percent to 5.8 mole percent, of combined styrene, from 86 mole percent to 94 mole percent, preferably from 89 mole percent to 92 mole percent, of combined ethyl acrylate, and from 0.8 mole percent to 5.5 mole percent, preferably from 1.6 mole percent to 3.0 mole percent, of combined acrylic or itaconic acid.

After the polymerization reaction is complete, it is desirable to adjust the latex to a pH of from about 4.0 to about 7.5, preferably from about 4.5 to about 7.0, in order to stabilize it. Any water-soluble base having a dissociation constant greater than about $10^{-14}$ can be employed, including, for example, ammonium hydroxide, sodium hydroxide, potassium hydroxide, ethylene diamine, morpholine, piperidine, trimethyl benzyl ammonium hydroxide, and the like. Ammonium hydroxide is most preferred because it imparts improved heat and water resistance properties to the crosslinked polymer.

The latex is now ready for use as a backcoating composition and can be applied by conventional means, such as brushing, spraying, dipping, roller-coating, casting, and the like. If desired, other ingredients conventionally used in backcoating compositions may be added, such as binders, fillers, filler dispersants, wetting agents, thickeners, plasticizers, antifoams, and the like.

The following examples are set forth for purposes of illustration so that those skilled in the art may better understand this invention, and it should be understood that they are not to be construed as limiting this invention in any manner. Unless otherwise specified, all parts and percentages as used therein are by weight.

*Example I*

An admixture of 147.25 parts of distilled water, 2.00 parts of Tergitol NP-35 (a commercially available nonylphenoxypolyethoxyethanol nonionic surfactant), 0.50 part of potassium persulfate, and 0.25 part of sodium bisulfite was prepared and charged to a glass reaction vessel. The mixture was heated to a temperature of 55° C. under a nitrogen atmosphere.

To the heated mixture was added, with continuous stirring over a period of 2½ hours, a second admixture containing 86 parts of ethyl acrylate, 2 parts of glycidyl acrylate, 10 parts of styrene, and 2 parts of acrylic acid. The mixture was maintained at a temperature of 55° C. to 61° C. during this period and for ½ hour thereafter. At the end of this time, a solution of 0.25 part of sodium bisulfite in 1.25 parts of distilled water was added and heating was continued at 59° C. to 70° C. for an additional hour. The resulting latex was then cooled and adjusted to a pH of 7.5 with ammonium hydroxide.

This latex was diluted with water to a 33 percent solids content, and then thickened to a viscosity of 6000 to 7000 centipoises. Ammonium hydroxide was added to adjust the pH to 8.5. A film was cast, air dried for 3 days, and then heated for 15 minutes at 300° F. The resulting film had a thickness of about 1/16 inch, had very little tack, and was very flexible.

A sample of the cast film (approximately two inches by two inches in width) was measured and placed in a beaker of boiling water for 30 minutes. This causes a swelling of approximately 15 percent.

When a similar sample was immersed in Sno-Flake Fabric Cleaner No. 8–589 for 16 hours, a swelling of approximately 5.3 percent resulted.

When a similar sample was heated in a forced air oven for 16 hours at a temperature of 137° C., the film was only slightly discolored to a light brown color.

*Example II*

An admixture of 116.25 parts of distilled water, 2.25 parts of Tergitol NPX (a commercially available nonylphenoxypolyethoxyethanol nonionic surfactant), 2.50 parts of a 30% solution of Sipex UB (a commercially available sodium lauryl sulfate anionic surfactant) in water, 1.00 part of potassium persulfate, and 0.50 part of sodium bisulfite was prepared and charged to a glass reaction vessel. The mixture was heated to a temperature of 35° C. under a nitrogen atmosphere.

To the heated mixture was added, with continuous stirring over a period of 2 hours, a second admixture containing 86 parts of ethyl acrylate, 2 parts of glycidyl acrylate, 10 parts of styrene, and 2 parts of acrylic acid. The mixture was maintained at a temperature of 35° C. to 51° C. during this period and for 1 hour thereafter. At the end of this time, the resulting latex was cooled and adjusted to a pH of 7.0 with ammonium hydroxide.

A film was cast from the latex and evaluated as in Example I. The same properties were displayed by this film as were displayed by the film prepared in accordance with Example I.

*Example III*

An admixture of 116.25 parts of distilled water, 2.25 parts of Tergitol NPX (a commercially available nonylphenoxypolyethoxyethanol nonionic surfactant), 2.50 parts of a 30% solution of sipex UB (a commercially available sodium lauryl sulfate anionic surfactant) in water, 1.00 part of potassium persulfate, and 0.50 part of sodium bisulfite was prepared and charged to a glass reaction vessel. The mixture was heated to a temperature of 36° C. under a nitrogen atmosphere.

To the heated mixture was added, with continuous stirring over a period of 2 hours, a second admixture containing 80 parts of ethyl acrylate, 2 parts of glycidyl acrylate, 16 parts of styrene, and 2 parts of acrylic acid. The resulting mixture was maintained at a temperature of 36° C. to 44° C. during this period and for 1 hour thereafter. At the end of this time, the resulting latex was cooled and adjusted to a pH of 7.0 with ammonium hydroxide.

A film was cast from the latex and evaluated as in Example I. Essentially the same properties were displayed by this film as were displayed by the films prepared in accordance with Examples I and II except that the film was a little less tacky and flexible.

*Example IV*

An admixture of 116.25 parts of distilled water, 2.25 parts of Tergitol NPX (a commercially available nonylphenoxypolyethoxyethanol nonionic surfactant), 2.50 parts of a 30% solution of Sipex UB (a commercially available sodium lauryl sulfate anionic surfactant) in water, 1.00 part of potassium persulfate, and 0.50 part of sodium bisulfite was prepared and charged to a glass reaction vessel. The mixture was heated to a temperature of 36° C. under a nitrogen atmosphere.

To the heated mixture was added, with continuous stirring over a period of 2 hours, a second admixture containing 91 parts of ethyl acrylate, 2 parts of glycidyl acrylate, 5 parts of styrene, and 2 parts of acrylic acid. The resulting mixture was maintained at a temperature of 36° C. to 46° C. during this period and for 1 hour thereafter. At the end of this time, the resulting latex was cooled and adjusted to a pH of 7.5 with ammonium hydroxide.

A film was cast from the latex and evaluated as in Example I. Essentially the same properties were displayed by the film as were displayed by the films prepared in accordance with Examples I and II except that the film was slightly more flexible.

*Example V*

An admixture of 113.25 parts of distilled water, 2.25 parts of Tergitol NPX (a commercially available nonylphenoxypolyethoxyethanol nonionic surfactant), 2.50 parts of a 30% solution of Sipex UB (a commercially available sodium lauryl sulfate anionic surfactant) in water, 0.25 part of potassium persulfate, and 0.50 part of sodium bisulfite was prepared and charged to a stainless steel reaction vessel. The mixture was heated to a temperature of 48° C. under a nitrogen atmosphere, and 3 parts of itaconic acid were added.

To the heated mixture was added, with continuous stirring over a period of 4½ hours, a second admixture containing 90 parts of ethyl acrylate, 2 parts of glycidyl acrylate, and 5 parts of styrene. The resulting mixture was maintained at a temperature of 45° C. to 50° C. during this period and for ½ hour thereafter. At the end of this time, the resulting latex was cooled and adjusted to a pH of 6.2 with ammonium hydroxide.

A film was cast from the latex and evaluated as in Example I. Essentially the same properties were displayed by the film as were displayed by the film prepared in accordance with Example IV.

What is claimed is:

1. An interpolymer consisting of from 0.9 mole percent to 2.7 mole percent of combined glycidyl acrylate, from 2.9 mole percent to 7.8 mole percent of combined styrene, from 86 mole percent to 94 mole percent of combined ethyl acrylate, and from 0.8 mole percent to 5.5 mole percent of combined itaconic acid.

2. An interpolymer as in claim 1 which has been crosslinked by means of the carboxyl and epoxy groups present.

3. An interpolymer consisting of from 1.3 mole percent to 2.2 mole percent of combined glycidyl acrylate, from 3.9 mole percent to 5.8 mole percent of combined styrene, from 89 mole percent to 92 mole percent of combined ethyl acrylate, and from 1.6 mole percent to 3.0 mole percent of combined itconic acid.

4. An interpolymer as in claim 3 which has been crosslinked by means of the carboxyl and epoxy groups present.

5. An aqueous emulsion consisting of:
 (a) from 0.35 percent by weight to 1.75 percent by weight of glycidyl acrylate;
 (b) from 1.1 percent by weight to 4.4 percent by weight of styrene;
 (c) from 30 percent by weight to 52 percent by weight of ethyl acrylate;
 (d) from 0.35 percent by weight to 2.2 percent by weight of itaconic acid;
 (e) from 0.35 percent by weight to 2.2 percent by weight of a nonionic emulsifier;
 (f) from 0.09 percent by weight to 1.1 percent by weight of a water-soluble vinyl polymerization catalyst; dispersed in
 (g) from 45 percent by weight to 65 percent by weight of water.

6. An aqueous emulsion as in claim 5 wherein up to 1.1 percent by weight of an anionic emulsifier is also present.

7. An aqueous emulsion consisting of:
 (a) from 0.66 percent by weight to 1.3 percent by weight of glycidyl acrylate;
 (b) from 1.76 percent by weight to 3.12 percent by weight of styrene;
 (c) from 39 percent by weight to 48 percent by weight of ethyl acrylate;
 (d) from 0.88 percent by weight to 1.56 percent by weight of itaconic acid;
 (e) from 0.88 percent by weight to 1.3 percent by weight of a nonionic emulsifier;
 (f) from 0.22 percent by weight to 0.52 percent by weight of a water-soluble vinyl polymerization catalyst; dispersed in
 (g) from 48 percent by weight to 56 percent by weight of water.

8. An aqueous emulsion as in claim 7 wherein from 0.22 percent by weight to 0.52 percent by weight of an anionic emulsifier is also present.

9. An aqueous emulsion containing from about 35 percent by weight to about 55 percent by weight of an interpolymer consisting of from 0.9 mole percent to 2.7 mole percent of combined glycidyl acrylate, from 2.9 mole percent to 7.8 mole percent of combined styrene, from 86 mole percent to 94 mole percent of combined ethyl acrylate, and from 0.8 mole percent to 5.5 mole percent of combined itaconic acid.

10. An aqueous emulsion as in claim 9 wherein the pH of the latex is between 4.0 and 7.5.

11. An aqueous emulsion containing from about 44 percent by weight to about 52 percent by weight of an interpolymer consisting of from 1.3 mole percent to 2.2 mole percent of combined glycidyl acrylate, from 3.9 mole percent to 5.8 mole percent of combined styrene, from 89 mole percent to 92 mole percent of combined ethyl acrylate, and from 1.6 mole percent to 3.0 mole percent of combined itaconic acid.

12. An aqueous emulsion as in claim 11 wherein the pH of the latex is between 4.5 and 7.0.

References Cited by the Examiner

UNITED STATES PATENTS

| | | | |
|---|---|---|---|
| 2,606,810 | 8/1952 | Erickson et al. | 260—2 |
| 2,962,471 | 11/1960 | Lang et al. | 260—80.5 |
| 2,972,592 | 2/1961 | Brown et al. | 260—29.6 |
| 3,025,181 | 3/1962 | Nuessle et al. | 260—80.5 |
| 3,068,183 | 12/1962 | Strolle et al. | 260—80.5 |

MURRAY TILLMAN, *Primary Examiner.*